United States Patent
Jia et al.

(10) Patent No.: US 11,907,728 B2
(45) Date of Patent: Feb. 20, 2024

(54) BIOS-BASED MULTI-USER MANAGEMENT METHOD AND SYSTEM

(71) Applicant: INSPUR SUZHOU INTELLIGENT TECHNOLOGY CO., LTD., Jiangsu (CN)

(72) Inventors: Shuaishuai Jia, Jiangsu (CN); Daotong Li, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 106 days.

(21) Appl. No.: 17/789,380

(22) PCT Filed: Oct. 27, 2020

(86) PCT No.: PCT/CN2020/123798
§ 371 (c)(1),
(2) Date: Jun. 27, 2022

(87) PCT Pub. No.: WO2021/159732
PCT Pub. Date: Aug. 19, 2021

(65) Prior Publication Data
US 2023/0040962 A1 Feb. 9, 2023

(30) Foreign Application Priority Data
Feb. 16, 2020 (CN) .......................... 202010094702.6

(51) Int. Cl.
 G06F 9/44 (2018.01)
 G06F 9/4401 (2018.01)
 G06F 21/31 (2013.01)
(52) U.S. Cl.
 CPC ............ *G06F 9/4401* (2013.01); *G06F 21/31* (2013.01)

(58) Field of Classification Search
None
See application file for complete search history.

(56) References Cited

U.S. PATENT DOCUMENTS

| 6,658,562 | B1 | 12/2003 | Bonomo et al. |
| 6,907,524 | B1 * | 6/2005 | Huntington, II ...... G06F 21/572 380/28 |

(Continued)

FOREIGN PATENT DOCUMENTS

| CN | 101395579 A | 3/2009 |
| CN | 102084313 A | 6/2011 |

(Continued)

OTHER PUBLICATIONS

International Search Report of corresponding PCT application PCT/CN2020/123798, dated Feb. 10, 2021, 7 pages.

(Continued)

*Primary Examiner* — Keshab R Pandey
(74) *Attorney, Agent, or Firm* — Cooper Legal Group LLC

(57) ABSTRACT

A Basic Input Output System (BIOS)-based multi-user management method and system. The method includes: identifying states of multiple users of a current BIOS to find a user whose state is an enable state; finding a Non-Volatile Random Access Memory (NVRAM) corresponding to the user in the enable state, and reading BIOS configuration parameter information of the user in the enable state; monitoring a hot key boot phase of a BIOS startup process to determine whether there is a key action at the hot key boot phase; and when there is no key action, performing a manipulation to configure the current BIOS with the read BIOS configuration parameter information of the user in the enable state, thereby effectively configuring the BIOS for the multiple users, and retaining more customized parameters in BIOS (Continued)

information. Therefore, a server becomes a diversely used terminal device more easily.

5 Claims, 3 Drawing Sheets

(56) References Cited

U.S. PATENT DOCUMENTS

2019/0114433 A1*  4/2019  de Cesare ............. G06F 21/575
2021/0240545 A1*  8/2021  Kumar ................. G06F 9/4406

FOREIGN PATENT DOCUMENTS

| | | |
|---|---|---|
| CN | 103827811 A | 5/2014 |
| CN | 106339616 A | 1/2017 |
| CN | 109684003 A | 4/2019 |
| CN | 111143826 A | 5/2020 |
| CN | 111241553 A | 6/2020 |
| CN | 111309389 A | 6/2020 |
| WO | 2017123225 A1 | 7/2017 |

OTHER PUBLICATIONS

Written Opinion of corresponding PCT application PCT/CN2020/123798, dated Feb. 10, 2020, 9 pages.
First Office Action cited in CN202010094702.6, dated Feb. 20, 2021, 12 pages.
Second Office Action cited in CN202010094702.6, dated Sep. 10, 2021, 14 pages.

* cited by examiner

BIOS-BASED MULTI-USER MANAGEMENT METHOD AND SYSTEM

This application claims priority to Chinese Patent Application No. 202010094702.6, filed on Feb. 16, 2020, in China National Intellectual Property Administration and entitled "BIOS-Based Multi-User Management Method and System", the contents of which are hereby incorporated by reference in its entirety.

FIELD

The present disclosure pertains to the technical field of servers, and particularly relates to a Basic Input Output System (BIOS)-based multi-user management method and system.

BACKGROUND

The 21$^{st}$ century is an era of rapid development of the Internet. A carrier for the information era is server, and there is an urgent need for servers in all walks of life now. As there are many industries, all industries have different requirements for servers.

As a core of a whole network system and computing platform, a server stores many important data. A BIOS is an underlying code of a server. Currently, only one set of BIOS parameters may be configured for the BIOS, and may be saved only as current set values if a client needs to customize the BIOS parameters. If the client needs another set of BIOS parameters as a standby configuration, it is unachievable, and it is necessary to discard current configuration information and make modifications again. As a result, the efficiency is quite low. In addition, if configurations of many items need to be modified, items modified before may not be memorized accurately.

SUMMARY

For the shortcomings in the prior art, the present disclosure provides a BIOS-based multi-user management method, so as to solve the problem in the prior art that only one set of BIOS parameters may be configured for a BIOS currently and a standby configuration of BIOS parameters is unachievable.

The following technical solutions are provided in the present disclosure. A BIOS-based multi-user management method is provided, including the following steps:

identifying states of multiple users of a current BIOS in a restart process of a server to find a user whose state is an enable state;

finding a Non-Volatile Random Access Memory (NVRAM) corresponding to the user in the enable state according to a correspondence correlation table between the user and the NVRAM, and reading BIOS configuration parameter information of the user in the enable state from the NVRAM;

in response to the BIOS configuration parameter information of the user in the enable state being read, monitoring a hot key boot phase of a BIOS startup process to determine whether there is a key action at the hot key boot phase;

in response to there being the key action at the hot key boot phase, performing a first manipulation to enter an interface matched with the key action; or in response to there being no key action at the hot key boot phase, performing a second manipulation to configure the current BIOS with the read BIOS configuration parameter information of the user in the enable state.

As an improved solution, before the step of identifying the states of multiple users of the current BIOS in the restart process of the server to find the user whose state is the enable state, the method further includes the following step:

creating a plurality of users in advance in the server for the BIOS, wherein simultaneously, one of the plurality of users is in the enable state, while other users are in a disable state.

As an improved solution, the step of creating the plurality of users in advance in the server for the BIOS specifically includes the following steps:

performing a third manipulation to boot into a BIOS interface in a startup process of the server;

receiving, on the BIOS interface, an input pre-configured key action, and performing a fourth manipulation to enter a set user interface matched with the key action;

receiving an input user name and password through the set user interface, and performing a fifth manipulation to enter each user of the BIOS;

performing a sixth manipulation, under each user of the BIOS, to generate the BIOS configuration parameter information corresponding to a current user, and storing the generated BIOS configuration parameter information in a corresponding NVRAM, wherein the correspondence correlation table is generated between the user and the NVRAM; and setting a default user in the plurality of users, wherein a state of the default user is the enable state, and in response to the state of the default user being modified to enable, states of other users are automatically synchronized to the disable state.

As an improved solution, the method further includes the following step:

in response to the server being booted into the BIOS interface during the startup process, adding a hot key to the hot key boot phase, wherein a function of the hot key is set user.

As an improved solution, after the step of receiving the input user name and password through the set user interface and performing the fifth manipulation to enter each user of the BIOS, and before the step of performing the sixth manipulation under each user of the BIOS to generate the BIOS configuration parameter information corresponding to the current user, the method further includes the following step:

receiving, in a BIOS user menu, an input password and new password of the current user, and performing a seventh manipulation to update a current password.

Another objective of the present disclosure is to provide a BIOS-based multi-user management system, including:

a user finding module, configured to identify states of multiple users of a current BIOS in a restart process of a server to find a user whose state is an enable state;

a memory finding module, configured to find a NVRAM corresponding to the user in the enable state according to a correspondence correlation table between the user and the NVRAM;

a BIOS configuration parameter information reading module, configured to read BIOS configuration parameter information of the user in the enable state from the NVRAM;

a key action monitoring judgment module, configured to, in response to the BIOS configuration parameter information of the user in the enable state being read, monitor a hot key boot phase of a BIOS startup process to determine whether there is a key action at the hot key boot phase;

a matched interface entering module, configured to, in response to there being the key action at the hot key boot phase, perform a first manipulation to enter an interface matched with the key action; and a BIOS configuration module, configured to, in response to there being no key action at the hot key boot phase, perform a second manipulation to configure the current BIOS with the read BIOS configuration parameter information of the user in the enable state.

As an improved solution, the system further includes:

a user creation module, configured to create a plurality of users in advance in the server for the BIOS, wherein simultaneously, one of the plurality of users is in the enable state, while other users are in a disable state.

As an improved solution, the user creation module specifically includes:

a BIOS interface booting module, configured to perform a third manipulation to boot into a BIOS interface in a startup process of the server;

a set user interface entering module, configured to receive, on the BIOS interface, an input pre-configured key action, and perform a fourth manipulation to enter a set user interface matched with the key action;

a user entering module, configured to receive an input user name and password through the set user interface, and perform a fifth manipulation to enter each user of the BIOS;

a BIOS configuration parameter information generation module, configured to perform a sixth manipulation, under each user of the BIOS, to generate the BIOS configuration parameter information corresponding to a current user;

a BIOS configuration parameter information storage module, configured to store the generated BIOS configuration parameter information in a corresponding NVRAM, wherein the correspondence correlation table is generated between the user and the NVRAM; and a default user setting module, configured to set a default user in the plurality of users, wherein a state of the default user is the enable state, and in response to the state of the default user being modified to enable, states of other users are automatically synchronized to the disable state.

As an improved solution, the system further includes:

a hot key adding module, configured to, in response to the server being booted into the BIOS interface during the startup process, add a hot key to the hot key boot phase, wherein a function of the hot key is set user.

As an improved solution, the user creation module further includes:

a password updating module, configured to receive, in a BIOS user menu, an input password and new password of the current user, and perform a seventh manipulation to update a current password.

In embodiments of the present disclosure, states of multiple users of a current BIOS are identified in a restart process of a server to find a user whose state is an enable state. A NVRAM corresponding to the user in the enable state is found according to a correspondence correlation table between a user and a NVRAM, and BIOS configuration parameter information of the user in the enable state is read. When the BIOS configuration parameter information of the user in the enable state is read, a hot key boot phase of a BIOS startup process is monitored to determine whether there is a key action at the hot key boot phase. When there is no key action, a manipulation is performed to configure the current BIOS with the read BIOS configuration parameter information of the user in the enable state, thereby effectively configuring the BIOS for the multiple users, and retaining more customized parameters in BIOS information. Therefore, the server becomes a diversely used terminal device more easily.

BRIEF DESCRIPTION OF THE DRAWINGS

In order to describe the technical solutions in specific implementation modes of the present disclosure or the prior art more clearly, the drawings required to be used in descriptions about the specific implementation modes or the prior art will be introduced briefly below. Similar components or parts in all of the drawings are generally marked with similar reference signs. In the drawings, each component or part is not necessarily drawn according to an actual scale.

DETAILED DESCRIPTION

Embodiments of the technical solutions of the present disclosure will be described below in combination with the drawings in detail. The following embodiments are only for describing the technical solutions of the present disclosure more clearly, and thus are only examples rather than limitations on the scope of protection of the present disclosure.

Figure 1:
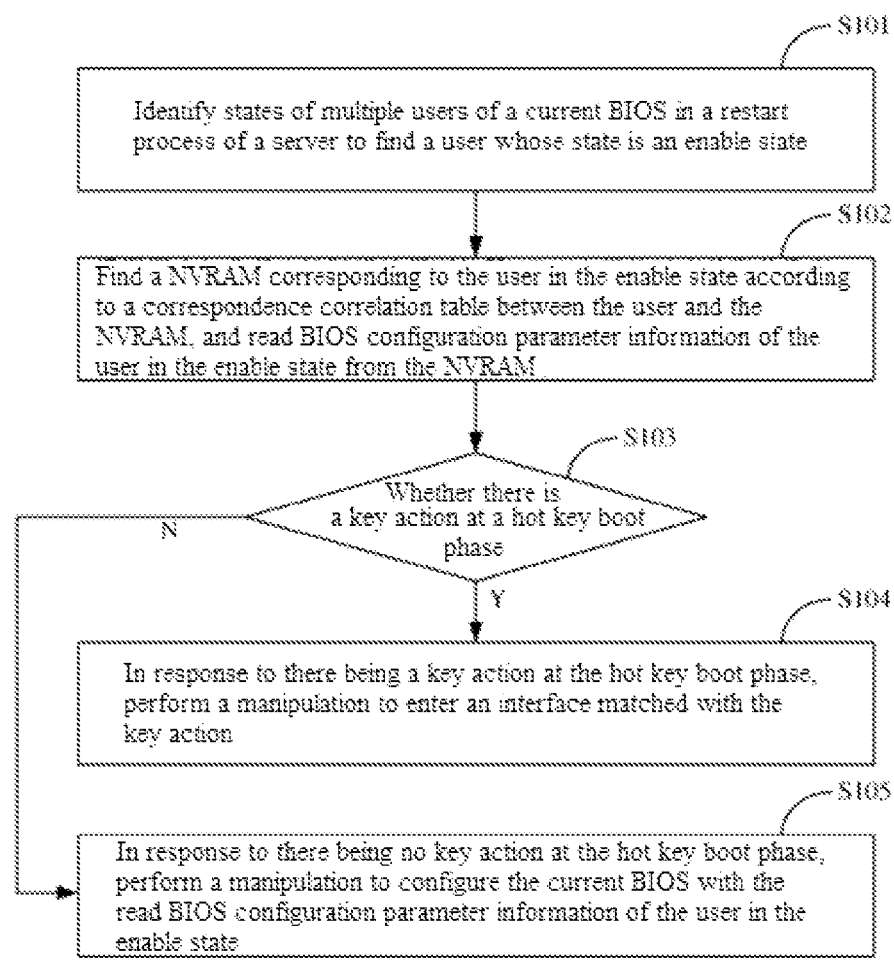
FIG. 1 is an implementation flowchart of a BIOS-based multi-user management method according to the present disclosure.

FIG. 1 is an implementation flowchart of a BIOS-based multi-user management method according to the present disclosure. The method specifically includes the following steps.

In step S101, states of multiple users of a current BIOS are identified in a restart process of a server to find a user whose state is an enable state.

In step S102, a NVRAM corresponding to the user in the enable state is found according to a correspondence correlation table between a user and a NVRAM, and BIOS configuration parameter information of the user in the enable state is read from the NVRAM.

In step S103, when the BIOS configuration parameter information of the user in the enable state is read, a hot key boot phase of a BIOS startup process is monitored to determine whether there is a key action at the hot key boot phase. If YES, step S104 is performed. Otherwise, step S105 is performed.

In step S104, when there is a key action at the hot key boot phase, a manipulation is performed to enter an interface matched with the key action.

In step S105, when there is no key action at the hot key boot phase, a manipulation is performed to configure the current BIOS with the read BIOS configuration parameter information of the user in the enable state.

In the embodiment of the present disclosure, before the step that states of multiple users of a current BIOS are identified in a restart process of a server to find a user whose state is an enable state, the method further includes the following step:

a plurality of users are created in advance in the server for the BIOS, wherein simultaneously, one of the plurality of users is in the enable state, while the other users are in a disable state.

In this embodiment, at most five accounts are configured in the BIOS of the server, named after user 1, user 2, user 3, user 4, and user 5 respectively, and initial passwords thereof are set to six 1s.

Figure 2:
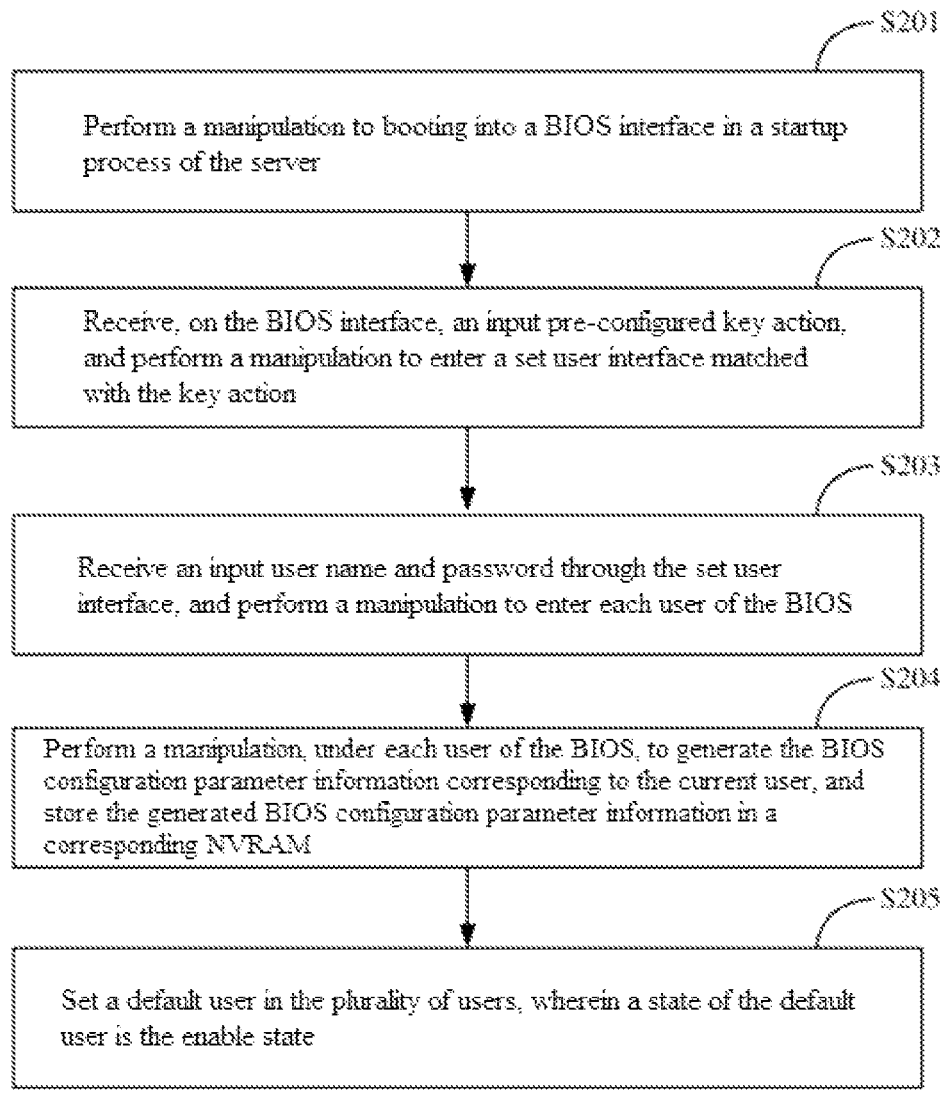
FIG. 2 is an implementation flowchart of creating a plurality of users in advance in a server for a BIOS according to the present disclosure.

In the embodiment of the present disclosure, as shown in FIG. 2, the step of creating a plurality of users in advance in the server for the BIOS specifically includes the following steps.

In step S201, a manipulation is performed to boot into a BIOS interface in a startup process of the server.

In this step, after the BIOS interface is booted, early Video Graphics Array (VGA, a video transmission standard) is run first, and then the hot key boot phase is entered. Hot key boot includes DEL, F11, and F12, wherein DEL is SETUP, F11 is Boot Menu, and F12 is PXE Boot.

In step S202, an input pre-configured key action is received on the BIOS interface, and a manipulation is performed to enter a set user interface matched with the key action.

In step S203, an input user name and password are received through the set user interface, and a manipulation is performed to enter each user of the BIOS.

In step S204, a manipulation is performed under each user of the BIOS to generate BIOS configuration parameter information corresponding to the current user, and the generated BIOS configuration parameter information is stored in a corresponding NVRAM, wherein the correspondence correlation table is generated between the user and the NVRAM.

In step S205, a default user is set in the plurality of users, wherein a state of the default user is the enable state, and when the state of the default user is modified to enable, states of the other users are automatically synchronized to the disable state.

In this embodiment, a hot key may be added based on the above hot keys, specifically as follows:

when the server is booted into the BIOS interface during the startup process, a hot key is added to the hot key boot phase, wherein a function of the hot key is set user. That is, a set user interface may be entered through the hot key. Elaborations are omitted herein.

In the embodiment of the present disclosure, after the step of receiving an input user name and password through the set user interface and performing a manipulation to enter each user of the BIOS, and before the step of performing a manipulation under each user of the BIOS to generate BIOS configuration parameter information corresponding to the current user, the method further includes the following step:

an input password and new password of the current user are received in a BIOS user menu, and a manipulation is performed to update a current password.

In the embodiment of the present disclosure, by the above settings, the BIOS may be configured effectively for the multiple users, and more customized parameters may be retained in BIOS information. Therefore, the server is more diversified.

Figure 3:
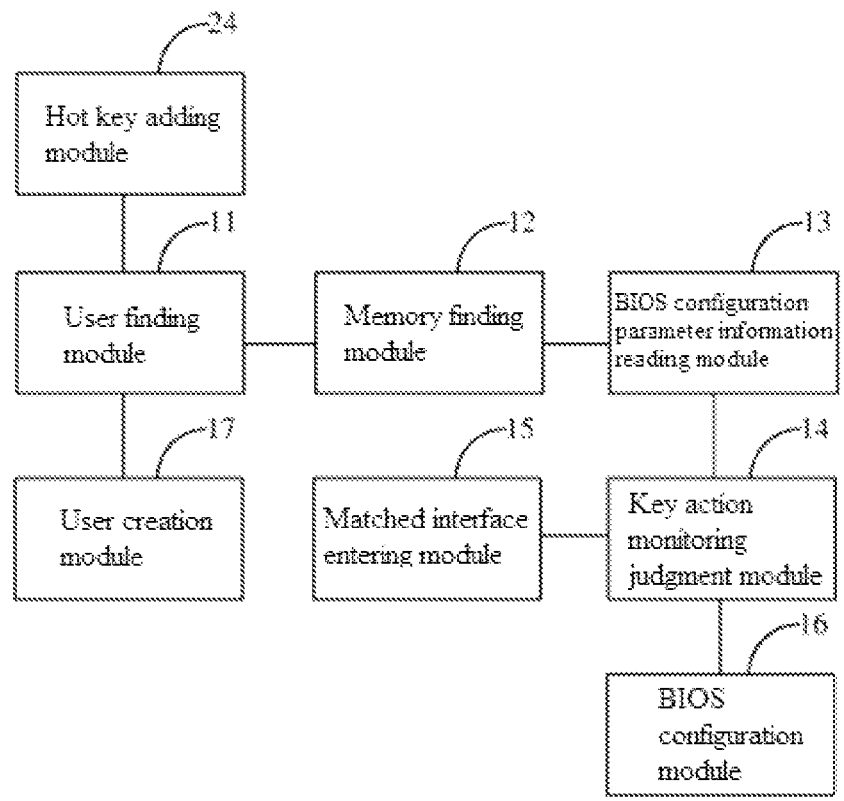
FIG. 3 is a structural block diagram of a BIOS-based multi-user management system according to the present disclosure.

FIG. 3 is a structural block diagram of a BIOS-based multi-user management system according to the present disclosure. For ease of description, the figure only shows parts related to the embodiment of the present disclosure.

The BIOS-based multi-user management system includes:

a user finding module 11, configured to identify states of multiple users of a current BIOS in a restart process of a server to find a user whose state is an enable state;

a memory finding module 12, configured to find a NVRAM corresponding to the user in the enable state according to a correspondence correlation table between a user and a NVRAM;

a BIOS configuration parameter information reading module 13, configured to read BIOS configuration parameter information of the user in the enable state from the NVRAM;

a key action monitoring judgment module 14, configured to, when the BIOS configuration parameter information of the user in the enable state is read, monitor a hot key boot phase of a BIOS startup process to determine whether there is a key action at the hot key boot phase;

a matched interface entering module 15, configured to, when there is a key action at the hot key boot phase, perform a manipulation to enter an interface matched with the key action; and a BIOS configuration module 16, configured to, when there is no key action at the hot key boot phase, perform a manipulation to configure the current BIOS with the read BIOS configuration parameter information of the user in the enable state.

In this embodiment, the system further includes:

a user creation module 17, configured to create a plurality of users in advance in the server for the BIOS, wherein simultaneously, one of the plurality of users is in the enable state, while the other users are in a disable state.

Figure 4:
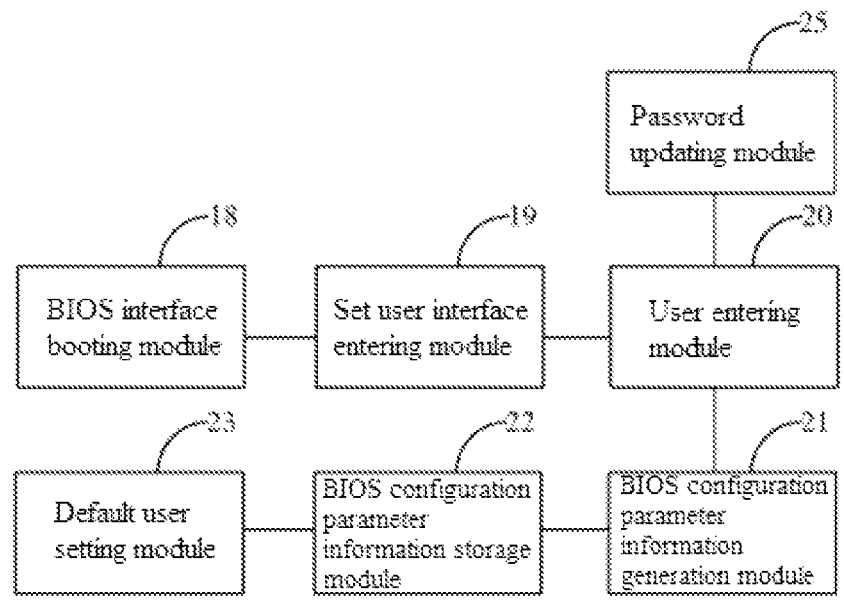
FIG. 4 is a structural block diagram of a user creation module according to the present disclosure.

In the embodiment of the present disclosure, as shown in FIG. 4, the user creation module 17 specifically includes:

a BIOS interface booting module 18, configured to perform a manipulation to boot into a BIOS interface in a startup process of the server;

a set user interface entering module 19, configured to receive, on the BIOS interface, an input pre-configured key action, and perform a manipulation to enter a set user interface matched with the key action;

a user entering module 20, configured to receive an input user name and password through the set user interface, and perform a manipulation to enter each user of the BIOS;

a BIOS configuration parameter information generation module 21, configured to perform a manipulation, under each user of the BIOS, to generate BIOS configuration parameter information corresponding to the current user;

a BIOS configuration parameter information storage module 22, configured to store the generated BIOS configuration parameter information in a corresponding NVRAM, wherein the correspondence correlation table is generated between the user and the NVRAM; and a default user setting module 23, configured to set a default user in the plurality of users, wherein a state of the default user is the enable state, and when the state of the default user is modified to enable, states of the other users are automatically synchronized to the disable state.

The user creation module 17 further includes:

a password updating module 25, configured to receive, in a BIOS user menu, an input password and new password of the current user, and perform a manipulation to update a current password.

In the embodiment of the present disclosure, the system further includes:

a hot key adding module 24, configured to, when the server is booted into the BIOS interface during the startup process, add a hot key to the hot key boot phase, wherein a function of the hot key is set user.

Each of the above modules has functions as recorded in the method embodiment, and elaborations are omitted herein.

In the embodiments of the present disclosure, states of multiple users of a current BIOS are identified in a restart process of a server to find a user whose state is an enable state. A NVRAM corresponding to the user in the enable state is found according to a correspondence correlation table between a user and a NVRAM, and BIOS configuration parameter information of the user in the enable state is read. When the BIOS configuration parameter information of the user in the enable state is read, a hot key boot phase of a BIOS startup process is monitored to determine whether there is a key action at the hot key boot phase. When there is no key action, a manipulation is performed to configure the current BIOS with the read BIOS configuration parameter information of the user in the enable state, thereby effectively configuring the BIOS for the multiple users, and retaining more customized parameters in BIOS information. Therefore, the server becomes a diversely used terminal device more easily.

Each of the above embodiments is only for describing rather than limiting the technical solutions of the present disclosure. Although the present disclosure is described with reference to each embodiment in detail, it can be understood by those ordinarily skilled in the art that modifications may be made to the technical solutions recorded in each embodiment, or equivalent replacements may be made to part or all of the technical features therein. These modifications or replacements ensure that the essence of the corresponding technical solutions does not depart from the spirit and scope of the technical solutions of each embodiment of the present disclosure, and shall all fall within the scope of the claims and specification of the present disclosure.

What is claimed is:

1. A Basic Input Output System (BIOS)-based multi-user management method, comprising the following steps:
   identifying states of multiple users of a current BIOS in a restart process of a server to find a user whose state is an enable state;
   finding a Non-Volatile Random Access Memory (NVRAM) corresponding to the user in the enable state according to a correspondence correlation table between the user and the NVRAM, and reading BIOS configuration parameter information of the user in the enable state from the NVRAM;
   in response to the BIOS configuration parameter information of the user in the enable state being read, monitoring a hot key boot phase of a BIOS startup process to determine whether there is a key action at the hot key boot phase;
   in response to there being the key action at the hot key boot phase, performing a first manipulation to enter an interface matched with the key action; and
   in response to there being no key action at the hot key boot phase, performing a second manipulation to configure the current BIOS with the BIOS configuration parameter information of the user in the enable state.

2. The BIOS-based multi-user management method according to claim 1, wherein before the step of identifying the states of multiple users of the current BIOS in the restart process of the server to find the user whose state is the enable state, the method further comprises the following step:
   creating a plurality of users in advance in the server for the current BIOS, wherein simultaneously, one of the plurality of users is in the enable state, while other users are in a disable state.

3. The BIOS-based multi-user management method according to claim 2, wherein the step of creating the plurality of users in advance in the server for the current BIOS specifically comprises the following steps:
   performing a third manipulation to boot into a BIOS interface in a startup process of the server;
   receiving, on the BIOS interface, an input pre-configured key action, and performing a fourth manipulation to enter a set user interface matched with the input pre-configured key action;
   receiving an input user name and password through the set user interface, and performing a fifth manipulation to enter each user of the current BIOS;
   performing a sixth manipulation, under each user of the current BIOS, to generate the BIOS configuration parameter information corresponding to a current user, and storing the BIOS configuration parameter information in a corresponding NVRAM, wherein the correspondence correlation table is generated between the user and the NVRAM; and
   setting a default user in the plurality of users, wherein a state of the default user is the enable state, and in response to the state of the default user being modified to enable, states of other users are automatically synchronized to the disable state.

4. The BIOS-based multi-user management method according to claim 3, further comprising the following step:
   in response to the server being booted into the BIOS interface during the startup process, adding a hot key to the hot key boot phase, wherein a function of the hot key is set user.

5. The BIOS-based multi-user management method according to claim 3, wherein after the step of receiving the input user name and password through the set user interface and performing the fifth manipulation to enter each user of the current BIOS, and before the step of performing the sixth manipulation, under each user of the current BIOS, to generate the BIOS configuration parameter information corresponding to the current user, the method further comprises the following step:
   receiving, in a BIOS user menu, an input password and new password of the current user, and performing a seventh manipulation to update a current password.

* * * * *